United States Patent [19]
Kogo et al.

[11] Patent Number: 5,695,880
[45] Date of Patent: Dec. 9, 1997

[54] LEAD-CONTAINING FLUORIDE GLASS, OPTICAL FIBER AND PROCESS FOR PRODUCING IT

[75] Inventors: Takashi Kogo; Hiroo Kanamori; Masashi Onishi, all of Yokohama; Yoshiaki Miyajima; Masataka Nakazawa, both of Mito, all of Japan

[73] Assignees: Sumitomo Electric Industries, Ltd., Osaka; Nippon Telegraph and Telephone Corp., Tokyo, both of Japan

[21] Appl. No.: 399,144

[22] Filed: Mar. 6, 1995

Related U.S. Application Data

[62] Division of Ser. No. 55,024, Apr. 30, 1993, Pat. No. 5,432,131.

[30] Foreign Application Priority Data

| May 1, 1992 | [JP] | Japan | 4-112693 |
| Apr. 23, 1993 | [JP] | Japan | 5-97815 |

[51] Int. Cl.⁶ ............................................. B32B 9/00
[52] U.S. Cl. ......................... 428/392; 428/373; 428/375; 428/389; 385/142; 385/144; 501/40
[58] Field of Search ..................... 428/375, 379, 428/389, 392; 385/142, 144; 501/40

[56] References Cited

U.S. PATENT DOCUMENTS

| 4,674,835 | 6/1987 | Mimura et al. | 428/373 |
| 4,728,350 | 3/1988 | Cocito | 65/3.11 |
| 4,761,387 | 8/1988 | Tokida et al. | 501/40 |
| 4,788,687 | 11/1988 | Miniscalco et al. | 372/40 |
| 4,836,643 | 6/1989 | France et al. | 385/142 |
| 5,070,506 | 12/1991 | Yanagita et al. | 372/40 |
| 5,081,076 | 1/1992 | Rapp | 501/40 |
| 5,274,728 | 12/1993 | Tran | 385/142 |
| 5,351,335 | 9/1994 | Ohishi et al. | 385/142 |

FOREIGN PATENT DOCUMENTS

| 0282155 | 9/1988 | European Pat. Off. |
| 0535798 | 4/1993 | European Pat. Off. |
| 0116149 | 7/1984 | Japan. |
| 1321406 | 12/1989 | Japan. |

OTHER PUBLICATIONS

Clare et al., "The Effect of Refractive Index Modifiers on the Thermal Expansion Coefficient of Fluoride Glasses", Physics And Chemistry Of Glasses, vol. 30, No. 6, Dec. 1989, Sheffield GB, pp. 207 and 208.

France et al, "Fluoride Glass Optical Fibers", Dec. 1990, Blackie, London, pp. 163–167 and 240–251.

*Primary Examiner*—Patrick Ryan
*Assistant Examiner*—J. M. Gray
*Attorney, Agent, or Firm*—Cushman Darby & Cushman IP Group of Pillsbury Madison & Sutro, LLP

[57] ABSTRACT

Lead-containing fluoride glass comprises 50–70 mol % of $ZrF_4$, 3–5 mol % of $LaF_3$, 0.1–3 mol % of $YF_3$, and 2–15 mol % of NaF and/or LiF and/or CsF, where $LaF_3+YF_3=$ 4.5–6 mol %, and further comprises lead. An optical fiber comprises a core made of the lead-containing fluoride glass and a cladding surrounding the core. A process for producing an optical fiber comprises forming a base material for a core of the lead-containing fluoride glass, forming a base material for a cladding of fluoride glass containing 30–60 mol % of $HfF_4$, and drawing the base materials into an optical fiber at a drawing temperature of 315–340 °C.

16 Claims, 2 Drawing Sheets

(IN CASE OF 8 mol % OF Pb ADDED)

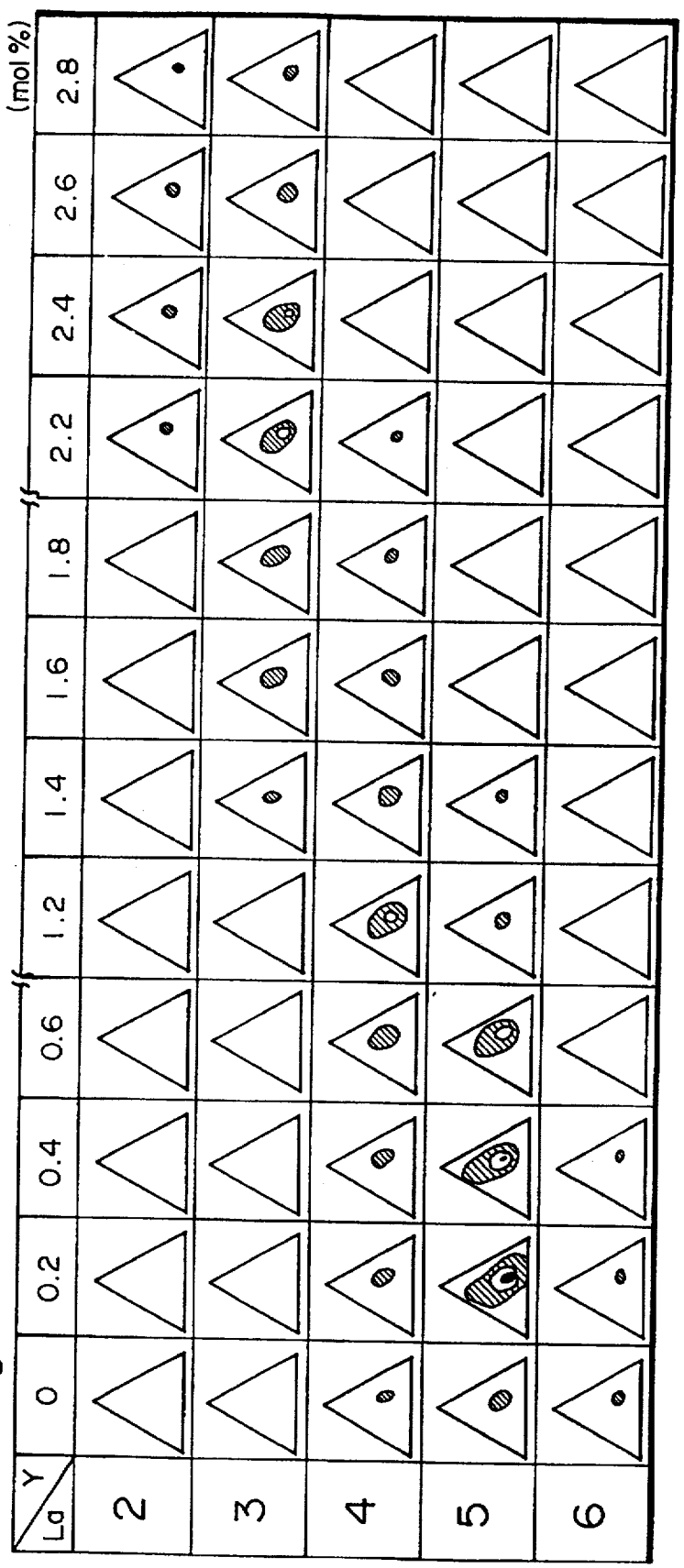
Fig.2A
Fig.2B

LEAD-CONTAINING FLUORIDE GLASS, OPTICAL FIBER AND PROCESS FOR PRODUCING IT

This is a division of application Ser. No. 08/055,024, filed Apr. 30, 1993, now U.S. Pat. No. 5,432,131.

BACKGROUND OF THE INVENTION

1. Field of the Invention

The present invention relates to lead-containing fluoride glass, an optical fiber with a core made thereof, and a process for fabricating the optical fiber, which may be applicable in the field of infrared sensors, optical amplifiers, or optical fiber lasers.

2. Related Background Art

A fluoride fiber is full of promise as an optical fiber for long distance transmission cables, for infrared sensors, or for optical amplifiers. A typical optical fiber is composed of two parts called a core and a cladding, in which the refractive index of the core, through which light propagates, is higher than that of the cladding. A relative refractive index difference is defined as follows:

$$\Delta n = (n_1 - n_2)/n_1 \times 100 \ (\%),$$

where $n_1$ is the refractive index of the core and $n_2$ is the refractive index of the cladding.

A fiber for an infrared sensor, etc., may have a greater input-output of light by increasing a numerical aperture (NA), which is a criterion of range for capturing light. Therefore, a larger relative refractive index difference $\Delta n$ is more desirable. A fluoride fiber with a core containing a rare earth element such as Nd (neodymium) or Pr (praseodymium) is also promising as a fiber for optical amplifier in 1.3 μm band of wavelength. In this case, a greater difference $\Delta n$ can make an optical power confined in the core and is, therefore, effective to increase a degree of amplification of light.

Incidentally, a most typical composition of the fluoride fiber is the ZBLAN series (Zr—Ba—La—Al—Na—F series). In general, the following methods are known to increase the difference $\Delta n$ in a fiber of this type.

(1) A method of making concentrations of Al (aluminum) or Na (sodium) in the core lower than those of Al or Na in the cladding.

(2) A method of adding a heavy metal such as Pb (lead) and Bi (bismuth) into the core.

(3) A method of adding Hf (hafnium) into the cladding. It is found that the most effective method is the method (2). It is stated for example in Japanese Journal of Applied Physics Vol. 20, No. 5, May, 1981, pp. L 337-L 339 that a high refractive index may be obtained by adding $PbF_2$ into a glass material basically comprising $33BaF_2$— $4GdF$—$63ZrF_4$ (mol %). The addition of a heavy metal such as Bi into the core can increase the refractive index but makes the core possibly colored, which is unfavorable for the core of an optical fiber in respect of transmission loss. In case that the additive is $PbF_2$, a fused material is likely to crystallize instead of forming glass. Therefore, the fluoride glass containing Pb has such a problem to be solved that the stable state is greatly affected depending upon composition of the entire system.

In connection with this, Japanese Laid-open (Kokai) Patent Application No. 1-321406 discloses that the fluoride glass in a composition of $49ZrF_4$—$(25-X)BaF_2$—$XPbF_2$—$3.5LaF_3$—$2YF_3$—$2.5AlF_3$—$18NaF$ (mol %) may have a difference $\Delta n = 2.8\%$ by adding $PbF_2$ up to X=12 (mol %) thereinto.

The present inventors tried to make fluoride glasses with various composition rates X of $PbF_2$ in accordance with the composition as described in the above Japanese Patent Application. The trial showed that transparent glasses could be obtained with X<5 mol %, but no good glass was obtained with X=5–12 mol % due to crystallization.

SUMMARY OF THE INVENTION

As described, the addition of a high concentration of $PbF_2$ is effective to increase the refractive index of a fluoride glass, but no conventional techniques have permitted glass formation from such a composition with a high $PbF_2$ concentration. It is, therefore, an object of the present invention to provide a fluoride glass, which has solved the problem as described, and also to provide an optical fiber using the fluoride glass for a core and a method for fabricating the optical fiber.

The lead-containing fluoride glass according to the present invention comprises 50–70 mol % of $ZrF_4$, 3–5 mol % of $LaF_3$, 0.1–3 mol % of $YF_3$, and 2–15 mol % of NaF and/or LiF and/or CsF, where $LaF_3 + YF_3 = 4.5$–6 mol %, and further comprises lead.

The optical fiber according to the present invention is characterized in that a core is made of the fluoride glass as described above. The optical fiber according to the present invention may preferably have a cladding made of a glass containing Hf.

In the present invention, the composition of the fluoride glass is arranged in the above range so that Pb may be relatively readily added in a higher concentration. The fiber with the core made of the Pb-containing fluoride glass may have a greater relative index difference $\Delta n$. Further, the fiber with the cladding made of the glass mainly containing Hf may have a further greater index difference $\Delta n$.

The present invention has attained a composition of fluoride glass into which a high concentration of Pb can be added. In a case where the glass of the composition according to the present invention is used for a core, a fiber having a high $\Delta n$ of about 2.5% may be fabricated. When Hf is added into the cladding of the fiber, the relative index difference may be increased to about 3.5 %. Therefore, when the fiber according to the present invention is used for optical amplification, the efficiency thereof may be highly increased.

Further objects and advantages of the present invention will be apparent from the description of the preferred embodiments with the accompanying drawings.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

BRIEF DESCRIPTION OF THE DRAWINGS

FIG. 2A is a drawing to show glass formable ranges in respective compositions according to the present invention;

FIG. 2B is a drawing to illustrate the details of the triangle as shown in FIG. 2A.

DESCRIPTION OF THE PREFERRED EMBODIMENTS

How the present invention has been accomplished and how the present invention may be characterized is briefly described, before the preferred embodiments are described.

Among fluoride glass materials containing ZBLAN, a most typical composition is 53Zr—20Ba—4La—3Al—20Na (mol %). $PbF_2$ may be added into such a glass while normally replacing $BaF_2$ or NaF. However, only 4–5 mol % of Pb can be added at most in this procedure. On the basis of repeated tests, it was found that Pb could be relatively readily added in a high concentration by adding $YF_3$ into the glass and further adjusting concentrations of $ZrF_4$ and $LaF_3$.

Figure 1:
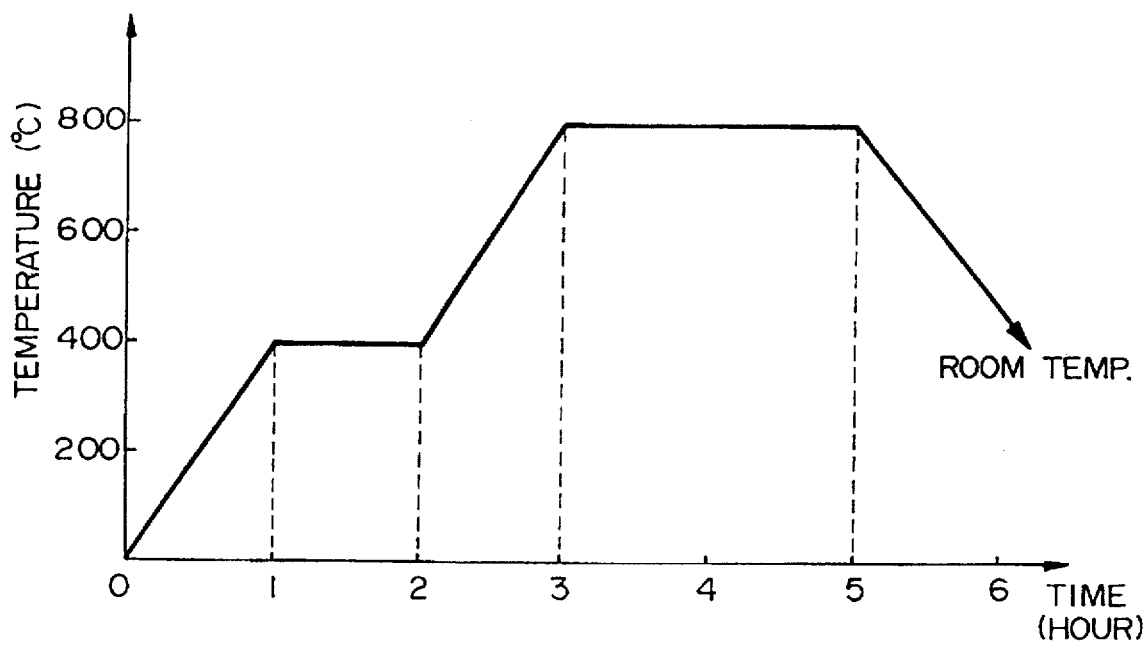
FIG. 1 graphically shows a melting pattern employed in checking glass formation in various compositions according to the present invention.

The above tests will be described while referring to FIG. 1 and FIG. 2. Fluoride raw materials of ZBLAN, i.e., Zr, Ba, etc., were first mixed in a batch amount of 25 g, and then placed in a platinum (Pt) crucible together with a small amount of $NH_4HF_2$ (ammonium bifluoride). The mixture was fused and then annealed along the temperature schedule as shown in FIG. 1 in a glove box which had a dew point of about −70° C., so as to confirm whether it could form glass. Test results with various compositions and glass forming regions are shown in phase diagrams (state diagrams) in FIG. 2A. FIG. 2B is a drawing to illustrate the details of each triangle of the phase diagram in FIG. 2A. In FIG. 2A, a blank triangle means that any composition in the triangle results in crystallization of the fused mixture.

It is seen from the test results that 5 or more mol % of $PbF_2$ can be added if $YF_3$ is adjusted in about 0.1–3 mol %, if $LaF_3$ is adjusted in about 3–5 mol %, and if $LaF_3+YF_3=$ 4.5–6 mol %. Further, if $ZrF_4$ is adjusted into an appropriate concentration, the concentration of $PbF_2$ can be raised up to about 10 mol %. In this case, $ZrF_4$ should be preferably contained in an amount of 50–70 mol %.

It is preferable that the Pb concentration is not more than 12 mol % in the lead-containing fluoride glass according to the present invention. More specifically, the Pb concentration may preferably be 3–12 mol %, and more preferably 5–12 mol %, in terms of PbF2 concentration.

The concentration of alkali metal of NaF and/or LiF and/or CsF should be preferably limited to within 2–15 mol %. The alkali metal has less influence on glass formation as compared to $ZrF_4$, $LaF_3$, and $YF_3$, but too large a difference in thermal expansion between glasses for a core and for a cladding would cause cracks during preform or fiber fabrication.

The lead-containing fluoride glass of the present invention may contain $BaF_2$ and $AlF_3$. The concentration of $BaF_2$ may preferably be 10–25 mol % and that of $AlF_3$ may preferably be 2–5 mol %.

In case that the lead-containing fluoride glass of the present invention contains $PrF_3$ or plural rare earth (element) fluorides inclusive of $PrF_3$, the concentration of $PrF_3$ or plural rare earth fluorides inclusive of $PrF_3$ may preferably be 0.007–0.07 mol % (0.01–0.1 wt %), and more preferably 0.035–0.07 mol % (0.05–0.1 wt %).

The lead-containing fluoride glass of the present invention is suitable for application of forming a core of an optical fiber. The cladding of the optical fiber may generally be made of a fluoride glass as well in case of use of such a core. The fluoride glass for the cladding may preferably have the following composition.

$ZrF_4$: 48–57 mol %

$BaF_2$: 15–25 mol %

$LaF_3$: 4–5.5 mol %

$AlF_3$: 3–4.5 mol %

NaF: 18–23 mol %

It is preferable in the present invention that the cladding is formed of a fluoride glass mainly containing Hf to make the relative index difference Δn greater. A preferable content of Hf is 30–60 mol % (as calculated in the form of $HfF_4$) in the fluoride glass constituting the clad. With Hf, a preferable composition of the fluoride glass for the cladding is as follows:

$ZrF_4$: 0–20 mol %

$BaF_2$: 10–25 mol %

$LaF_3$: 4–5.5 mol %

$AlF_3$: 3.5–4.5 mol %

NaF: 21–23 mol %

$HfF_4$: 30–60 mol % where $ZrF_4+HfF_4=50–60$ mol %.

The present invention will be further described with specific examples.

EXAMPLE 1

Fluoride raw materials were first weighed in a composition of $62ZrF_4$—$20.5BaF_2$—$5LaF_3$—$2.3AlF_3$—$2NaF$—$8PbF_2$—$0.2YF_3$ (mol %) in a batch amount of 50 g and then mixed in a glove box, a dew point of which was kept at about −70° C. The mixed powder was placed in a Pt crucible together with 2.6 g of $NH_4HF_2$. The resultant mixture was fused in an atmosphere of $N_2$ or Ar in a melting (or smelting) furnace at 400° C. for one hour and further at 900° C. for two hours. The molten mixture was then cast in a Pt tray crucible of 7 mm in width, 7 mm in height, 140 mm in length, and 0.3 mm in thickness. Thereafter, the molten mixture was further fused at 860° C. for one hour. The thus fused mixture was taken with the crucible out of the melting furnace and then annealed to obtain transparent glass. The glass was then removed from the Pt tray crucible, and ground and polished into a core rod of 3 mm in outer diameter and 130 mm in length.

Further, there was provided mixed powder of raw materials for a cladding having a raw material composition of $55ZrF_4$—$19.5BaF_2$—$4LaF_3$—$3AlF_3$—$18.5NaF$ (mol %). The raw material mixture powder in a batch amount of 130 g was placed in a platinum crucible together with 6.8 g of $NH_4HF_2$, and the resultant mixture was subjected to the same process as in the preparation of the core rod. In detail, the above mixture was fused in the melting furnace, the thus obtained molten mixture was cast in a Pt tray crucible, and thereafter further fused, in the same manner as in the preparation of core rod as described above. The thus obtained glass rod of 15 mm in width, 15 mm in height, and 140 mm in length was ground, drilled, and further polished to obtain a cladding tube of 10 mm in outer diameter, 3 mm in inner diameter, and 130 mm in length.

By use of the core rod and the cladding tube thus prepared in the above procedures, a fiber was fabricated by drawing them in the rod-in-tube method. The thus fabricated fiber had specific values of 125 μm in outer diameter, 40 μm in core diameter, and Δn=2.6%.

Since HfF$_4$ addition into the cladding may greatly decrease the refractive index of the cladding, a higher index difference Δn may be attained by fabricating a fiber in combination of the above core with a cladding into which HfF$_4$ is added. The amount of addition of HfF$_4$ may preferably be 30–60 mol %. The reason for that will be described with reference to FIG. 3.

Figure 3:
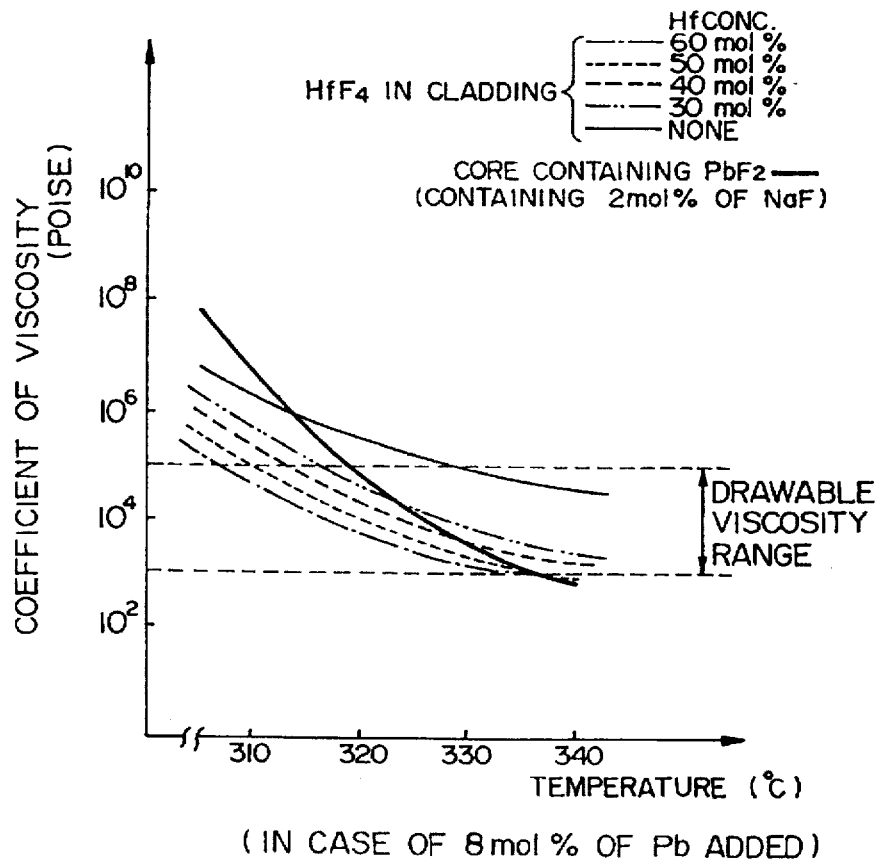
FIG. 3 graphically shows a relation between viscosity and temperature in core glass and cladding glass.

FIG. 3 shows a relation between temperature and viscosity in each core glass with 8 mol % of PbF$_2$ added, and cladding glasses with no Hf, with 30 mol % Hf, with 40 mol % Hf, with 50 mol % Hf, and with 60 mol % Hf, respectively. The temperature for fiber drawing may generally preferably be set so that coefficients of viscosity of core and cladding glasses are $10^3$–$10^5$ poises.

The coefficient of viscosity of the core glass is in the above range at a temperature between about 315° C. and about 340° C. When this temperature range is observed, it is found that the cladding glass with no Hf has an order of viscosity coefficient higher by a figure or more than that of the core glass. In contrast, the cladding glass with 30–60 mol % Hf added has a behavior of viscosity change comparatively similar to that of the core glass, and, therefore, the concentration of HfF$_4$ should preferably be determined in this concentration range.

EXAMPLE 2

The same core as prepared in Example 1 was employed. A cladding was prepared as follows. Raw materials for the cladding were mixed in a composition of 10ZrF$_4$—18BaF$_2$—4.5LaF$_3$—4.2AlF$_3$—23.3NaF—40HfF$_4$ (mol %), and the resultant raw material mixture was placed in a Pt crucible together with 5–10 g of NH$_4$HF$_2$.

The mixture was fused in an atmosphere of N$_2$ (or Ar) at 400° C. for one hour and then at 900° C. for two hours, the molten mixture was cast in a Pt tray crucible of 15 mm in width, 15 mm in height, 140 mm in length, and 0.3 mm in thickness, and the cast mixture was further fused at 860° C. for one hour, in the same manner as in Example 1. A cladding tube of 10 mm in outer diameter, 3 mm in inner diameter, and 130 mm in length was formed from the thus obtained glass rod. A fiber was drawn from the cladding tube and the aforementioned core in the rod-in-tube method. The thus obtained fiber had an outer diameter of 125 μm, a core diameter of 40 μm, and Δn=3.5%.

EXAMPLE 3

The same core as in Example 1 was prepared, and three claddings were prepared in the same composition as in Example 1, two having an outer diameter of 10 mm, an inner diameter of 3 mm, and a length of 120 mm, and the other having an outer diameter of 11.5 mm, an inner diameter of 3 mm, and a length of 120 mm. By use of the core and the three claddings, the rod-in-tube method was repeated three times to fabricate a fiber with a thick cladding layer but without being crystallized. The thus produced fiber had an outer diameter of 125 μm, a core diameter of 3 μm, Δn=2.6%, and λc (cut-off wavelength)=1.25 μm.

The fiber fabrication may be attained by the suction casting method or the built-in casting method as well as by the rod-in-tube method to produce multi-mode optical fibers as well as single-mode optical fibers. Care should be taken in these methods when a base material produced is taken out after being cooled to room temperature. If there is too large a difference in the thermal expansion coefficient between the glass materials of the core and cladding, especially if the thermal expansion coefficient of the cladding is greater than that of the core, the base material would have cracks.

As seen from the graph of FIG. 3, the core glass with 2 mol % of NaF and 8 mol % of Pb added has a larger coefficient of viscosity than the cladding glass with HfF$_4$ in the range of relatively low temperature, and the difference between them increases with decrease of temperature. The glass transition temperature T$_g$ normally increases as the coefficient of viscosity of glass becomes larger. It is known that there is the following relation between the glass transition temperature T$_g$ and the thermal expansion coefficient α for fluoride glass: α·T$_g$$^2$~5.6 (nearly equal to 5.6). Thus, the higher the glass transition temperature T$_g$, the smaller the thermal expansion coefficient α. The viscosity of glass is most affected by an alkali metal element, and the glass becomes softer as the amount of the alkali metal element increases.

As for the core and cladding glass materials in the compositions as described in Examples 1–3, the thermal expansion coefficient α of the cladding is greater than α of the core at a temperature near to room temperature. In the present invention, however, no cracks were observed even with α of either one of the core and cladding being greater than that of the other, if 2–15 mol % of NaF and/or LiF and/or CsF were added in the above compositions.

EXAMPLE 4

A single-mode optical fiber was fabricated by the suction casting method. Fluoride raw materials were mixed in a core composition of 58ZrF$_4$—16.5BaF$_2$—5LaF$_3$—2.3AlF$_3$—10NaF—8PbF$_2$—0.2YF$_3$ (mol %) in a batch amount of 70 g. Further, raw materials for a cladding were mixed in the same composition as in Example 2 in a batch amount of 130 g. 5–10 g of NH$_4$HF$_2$ was added into each of the batches.

The cladding raw materials and the core raw materials were placed in separate platinum crucibles, and then fused at 400° C. for one hour and then at 900° C. for two hours. The molten cladding mixture was then poured into a mold of brass having an outer diameter of 30 mm, an inner diameter of 10 mm, and an internal depth of 120 mm. The mold was left standing for a while, so that the molten mixture started solidifying and was recessed in the glass central portion due to the shrinkage effect of glass. The molten core mixture was poured into the recess. After the core mixture solidified, they were placed in an annealing furnace with the mold, and left standing overnight. An appropriate temperature range was 260°–300 °C.

The resultant base material was taken out of the mold, and a portion, in which a ratio of the cladding to the core (a ratio of the fiber outer diameter to the core diameter) was 4.2, was cut out. The cut portion was then drawn to obtain a rod having an outer diameter of 3 mm and a length of 110 mm. Two tubes were separately prepared with an outer diameter of 10 mm, an inner diameter of 3 mm, and a length of 100 mm in the same composition as in Example 2. The rod-in-tube method was repeated twice by using the two tubes with the rod to fabricate a fiber. The thus obtained fiber had an outer diameter of 125 μm, a core diameter of 2.7 μm, Δn=3.2%, and λc=1.28 μm.

EXAMPLE 5

Raw materials for a core were mixed in a composition of 57ZrF$_4$—20.5BaF$_2$—4.93LaF$_3$—0.07PrF$_3$—2.3AlF$_3$—5NaF—10PbF$_2$—0.2YF$_3$ (mol %) in a batch amount of 70 g. Also, raw materials for a cladding were mixed in the same composition as in Example 2 in a batch amount of 130 g. 5–10 g of NH$_4$HF$_2$ was added in the same manner as in the above examples.

A preform was prepared in the same manner as that described in Example 4. A portion of the preform, in which the ratio of the cladding to the core was 5.5, was cut out, and then drawn into a rod with an outer diameter of 3 mm and a length of 110 mm. Further, two tubes were separately prepared with an outer diameter of 10 mm, an inner diameter of 3 mm, and a length of 100 mm in the same manner as in Example 4. The rod-in-tube method was repeated twice, by using the rod and the two tubes to fabricate a fiber.

The thus obtained fiber had an outer diameter of 125 μm, a core diameter of 2.0 μm, Δn=3.5%, and λc=0.95 μm. By use of 10 m of this fiber, a test was conducted such that signal light with a wavelength of 1.3 μm and a fiber input power of −40dBm was input to the fiber end simultaneously with excitation light with a wavelength of 1.02 μm and a fiber input power of 200 mW. A signal light gain of 10 dB was observed in the test.

Many modifications of the present invention may be made without departing from the essential scope thereof. It should be understood that the present invention is not limited to the specific embodiments as described.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. An optical fiber comprising:
    a core; and
    a cladding surrounding said core,
    said core comprising a fluoride glass comprising:
        50–70% mol % of $ZrF_4$,
        4–5 mol % of $LaF_3$,
        0.1–2 mol % of $YF_3$,
        lead, and
        2–15 mol % of at least one component selected from the group consisting of NaF, LiF and CsF,
    wherein $LaF_3+YF_3$=4.5–6 mol %,
    said cladding comprising a fluoride glass comprising:
        48–57 mol % of $ZrF_4$,
        15–25 mol % of $BaF_2$,
        4–5.5 mol % of $LaF_3$,
        3–4.5 mol % of $AlF_3$, and
        18–23 mol % of NaF.

2. An optical fiber according to claim 1, wherein the at least one component is NaF.

3. An optical fiber according to claim 2, wherein said core further comprises LiF.

4. An optical fiber according to claim 2, wherein said core further comprises CsF.

5. An optical fiber according to claim 2, wherein said core further comprises LiF and CsF.

6. An optical fiber according to claim 1, wherein the at least one component is LiF.

7. An optical fiber according to claim 6, wherein said core further comprises CsF.

8. An optical fiber according to claim 1, wherein the at least one component is CsF.

9. An optical fiber according to claim 1, wherein said core further comprises $PrF_3$.

10. An optical fiber according to claim 9, wherein said core further comprises another rare earth fluoride.

11. An optical fiber according to claim 10, wherein the $PrF_3$ and another rare earth fluoride in said core are present in an amount of 0.007–0.07 mol %.

12. An optical fiber according to claim 9, wherein the $PrF_3$ in said core is present in an amount of 0.007–0.07 mol %.

13. An optical fiber according to claim 9, which is a single-mode optical fiber at a propagating light wavelength of 1.02 μm.

14. An optical fiber according to claim 1, wherein the lead in said core is present in an amount of 3–12 mol %.

15. An optical fiber according to claim 14, wherein the lead in said core is present in an amount of 5–12 mol %.

16. An optical fiber according to claim 1, which is a single-mode optical fiber at a propagating light wavelength of 1.3 μm.

* * * * *